United States Patent [19]
Hrabák et al.

[11] 4,072,805
[45] Feb. 7, 1978

[54] METHOD FOR PRODUCING POLYMERS

[75] Inventors: František Hrabák; Milan Bezdék; Vlasta Hynková; Karel Bouchal, all of Prague, Czechoslovakia

[73] Assignee: Ceskoslovenska akademie ved, Prague, Czechoslovakia

[21] Appl. No.: 512,428

[22] Filed: Oct. 7, 1974

Related U.S. Application Data

[63] Continuation of Ser. No. 281,285, Aug. 17, 1972, abandoned, which is a continuation of Ser. No. 187,813, Oct. 8, 1971, abandoned.

[30] Foreign Application Priority Data

Oct. 9, 1970  Czechoslovakia ................... 6829/70

[51] Int. Cl.$^2$ ............................ C08F 8/18; C08F 8/34
[52] U.S. Cl. .................. 526/43; 204/159.18; 526/16; 526/21; 526/27; 526/29; 526/41; 526/46; 526/48.1; 526/49
[58] Field of Search ...................... 526/16, 43, 46, 47, 526/48, 41, 29, 27, 21; 204/159.18, 159.14

[56] References Cited

U.S. PATENT DOCUMENTS 3,934,595  1/1976  Dermain et al. ...................... 526/46

FOREIGN PATENT DOCUMENTS 47-1208  1/1972  Japan.
849,042  9/1960  United Kingdom.

OTHER PUBLICATIONS

Chemical Abstracts, vol. 60, p. 14047(t), 1964.

*Primary Examiner*—Richard B. Turer

[57] ABSTRACT

Method for producing polymers comprises connecting polymeric molecules at least one of which contains tertiary amino groups chemically bound in the chain in the presence of materials such as elemental halogens, compounds of the elements of groups 3 through 8 of the Periodic Table containing one or more halogen atoms or halogen containing organic compounds. It is possible to connect chains of identical or different types and in this way increase the molecular weight, produce block copolymers, cure films and varnishes and perform vulcanization and the like at ambient temperature.

11 Claims, No Drawings

METHOD FOR PRODUCING POLYMERS

BACKGROUND OF THE INVENTION

This is a continuation of Ser. No. 281,285, filed Aug. 17, 1972 which in turn was a continuation of Ser. No. 187,813 filed Oct. 8, 1971, both abandoned.

This invention relates to a process for preparing polymers. More particularly, the invention relates to a process for producing polymers by connecting polymeric molecules by chemical bonds in which at least one of the polymers to be connected contains chemically bound tertiary amino groups.

In general, present methods or processes used for connecting macromolecules make use of functional groups attached to the polymeric chains and which readily condense with cross-linking agents (such as, for example, hydroxy groups reacting with isocyanates or dianhydrides). A disadvantage of the known methods resides in the fact that functional groups, such as the aforesaid groups, react relatively readily with the components of the polymerization charges in the production of the polymers or with the components of polymeric mixtures as their processing takes place. In addition, the utilization of high temperatures is generally necessary in many cases in carrying out these processes. There exists, therefore, a need for a process for connecting polymeric molecules which does not exhibit the mentioned disadvantages. The present invention provides such a process.

SUMMARY OF THE INVENTION

In accordance with the invention, there is provided a process for connecting at least two polymeric molecules at least one of which contains chemically bound tertiary amino groups comprising the steps of mixing the polymeric molecules to be connected, contacting the mixture with a material selected from the group consisting of elemental halogens, halogen containing organic compounds and halogen compounds of the elements of the third through eighth groups of the Periodic Table for a time sufficient to allow the reaction between the polymeric molecules to run to substantial completion at ambient temperatures and recovering a connected polymeric product.

DESCRIPTION OF THE PREFERRED EMBODIMENTS

Generally, the present invention is based on the fact that polymers and copolymers containing at least one chemically bound tertiary amino group in the molecule can readily be connected by the process of this invention. Consequently, a wide variety of polymeric molecules can be employed in the practice of this invention. The molecules can be, for example, either linear polymeric chains of the same type, such as polystyrene with polystyrene or chains of a different type, such as polystyrene with polybutadiene, so long as at least one chemically bound tertiary amino group is present in one polymer chain. It is to be understood, however, that any polymer containing one or more chemically bound tertiary amino groups can be employed in the practice of this invention. Furthermore, polymers or copolymers which contain a larger number of chemically bound tertiary amino groups and which are soluble and/or meltable are generally converted into insoluble cross-linked polymers in accordance with this invention. In contrast, polymers and copolymers containing a low number of chemically bound tertiary amino groups, when connected, maintain their solubility. Generally, therefore, the density of the cross-links formed between polymeric chains can be controlled by the number of tertiary amino groups built into the chain, as well as by the amount of halogen compound employed. Consequently, as the number of tertiary amino groups in a polymeric molecule is increased, the density of the cross-links is increased and insoluble connected macromolecules are achieved where identical chains are connected. Where, however the number of tertiary amino groups is decreased in connecting identical chains, non-cross-linked macromolecules are obtained which are generally soluble. In those cases where the number of tertiary amino groups is increased and when connecting different types of chains, cross-linked block copolymers are formed. Likewise, where the number of amino groups is decreased, soluble block copolymrs are formed.

The tertiary amino groups can be built into a polymer and/or polymers to be connected by any suitable method, such as during production of the original polymer chains by the addition of a suitable comonomer containing the amino groups or by any other suitable method.

In addition to the elemental halogens, any halogen compounds of elements of the third through the eighth groups of the Periodic Table and any halogen containing organic compounds, such as, for example, the monohalogenated and polyhalogenated alkanes and halogen containing polymers can be employed in carrying out the process of this invention. Many examples of halogen compounds are set forth in the table below. Moreover, the halogen compound is generally employed in at least an amount that is equivalent to the amino group content of the polymer to be connected.

Generally, the process of this invention is carried out simply by mixing the polymeric materials to be connected along with the halogen compound and connecting the polymers at ambient temperature until the reaction runs to completion. However, the reaction can be sped up by simultaneously subjecting the reaction mixture to ultraviolet or visible light.

Furthermore, the connection of the polymeric molecules can take place in solutions, aqueous emulsions or dispersions as well as solid mixtures of the polymer or melts thereof. In general, where solution polymerization processes are employed in carrying out the process of this invention, any known liquid solvents which are solvents for the particular polymers and/or aminopolymer being used can be employed except those which react with tertiary amines, such as, for example, organic acids which form salts with the amines and certain alkylhalides which form quaternary salts with the amines. Examples of suitable readily available and inexpensive solvents which may be used in this invention are benzene and water. In addition, the process of connecting the polymeric macromolecules can be accomplished in latices formed with any known emulsifier providing the pH value of any latex used is adjusted to a value in a range of from about 6 to about 12 before addition of the halogen material. Examples of suitable emulsifiers are potassium laurate and mersolate*.

*Trade mark for alkyl sulfonate detergents prepared by the sulfochlorination of Fischer-Tropsch paraffins.

The criteria for effecting the process in solution, emulsion or melt are dependent upon a number of factors, such as the character of the product being formed and the properties of the aminopolymer to be connected, such as its solubility, temperature of transition into a plastic state and the degradation temperature. For example, solution and emulsion processes in which the halogen material is added to a solution or emulsion comprising the aminopolymer can be used if hardening or curing of coatings, such as in paints or sheets or films of the aminopolymer, is desired. Such is also true in those cases where it is desired to form turbidity in the solution or emulsion of aminopolymer (aqueous or nonaqueous) and in those cases where it is desirable to form, in solutions or emulsions of aminopolymer, higher molecular weight materials or to join polymeric chains of different character or to produce a solution or emulsion of a block copolymer. On the other hand, a melt process is generally useful to increase or raise the molecular weight of solid polymers, or to produce solid block copolymers from two or more different polymers, of which at least one is an aminopolymer, in suitable, known types of mixing apparatus, rolling mills or molding apparatus.

The process of this invention is useful in a wider variety of areas. Some examples of technical application of the invention are:

1. Increasing the molecular weight of homopolymers (by connecting of identical chains with a low number of amino groups). Higher molecular weight polymers can be achieved usually by reducing the rate of polymerization, as is well known in the use of polymers. The process of this invention permits the use of higher rates of polymerization and subsequently connecting the polymeric chains after polymerization is completed.

2. In the production of block copolymers, the process of this invention results in the formation of block copolymers with properties different from those of the original homopolymers by connecting of qualitatively different chains which contain a small number of amino groups.

3. In the production of varnishes, modified solutions, aqueous emulsions or dispersions of polymers which contain tertiary amino groups can be employed as film-forming compositions which are cured in air at common or ambient atmospheric temperature.

4. In the vulcanization of polymers, homopolymers which contain a higher concentration of tertiary amino groups or mixtures of such homopolymers can be vulcanized according to the process of this invention at common or ambient room temperature.

THE EXAMPLES

The process of this invention is further elucidated, but not limited, in the concrete examples set out below which are presented in Tables I to IV. The solutions of polymers or copolymers, which are mentioned in the Tables, were placed along with the halogen material in a suitable vessel made of silica-alumina glass and irradiated with ultraviolet light (a mercury discharge lamp) for at most 6 hours. If no formation of gel was observed during this procedure, the vessel was placed in a stand and kept at common or ambient laboratory temperature in alternating daylight (diffusion light filtered by a window glass) and night darkness. The total periods of time from mixing of solutions to the appearance of gel under the aforementioned conditions are presented in the Tables as the time data without parentheses. The periods of time required for the formation of gel by interaction of the polymer in the presence of halogen compounds in darkness are given in parentheses. The following polymers whose mean number molecular weights ($M_n$) were measured by osmometry were used: poly (p-dimethylaminostyrene) with $M_n$ about 240000 (polyDMAS), copolymer of one part by weight of dimethylaminoethyl acrylate with one part by weight of methyl methacrylate (polyDMAEA-MMA), poly (dimethylaminoethyl methacrylate) with $M_n$ about 297000 (polyDMAEMA), poly (dimethylaminoethyl) acrylate (polyDMAEA) and the copolymer of three parts by weight of styrene and one part by weight of dimethylaminostyrene (polyS-DMAS). The viscosity of pure benzene solutions of polyDMAS, that is without the presence of halogen, began to increase in light first after 14 days and the viscosities of the other polymers under study did not change even after 30 days.

Table 1

(Examples 1 to 72)
In all cases, a solution of 0.1 gram of polymer or copolymer in 2 ml of benzene was used. The amount of halogen compound was equimolar to the amino group content of the polymer.

| Example | Halogen compound | PolyDmas | PolyDMAEA-MMA | PolyDMAEMA | PolyDMAEA |
|---|---|---|---|---|---|
| 1 | Ethyl iodide | | (2hr) | | |
| 2 | Benzyl chloride | | (5hr) | | |
| 3 – 4 | Chloroform | 2hr (36hr) | | | |
| 5 – 8 | Bromoform | 3hr | 5hr | 1hr | 3hr |
| 9 – 15 | Iodoform | 1hr | 30min (30min) | 30min (30min) | 5hr (5hr) |
| 16 – 17 | Trichloroethylene | 2hr (16hr) | | | |
| 18 – 25 | Chloral | 1min (5hr) | 1min (2min) | 1min (2min) | 1min (2min) |
| 26 – 27 | 2,2,2-Trichloroethanol | 1hr (6hr) | | | |
| 28 – 32 | Tetrachloromethane | 30min (7days) | 3days | 2days | 14days |
| 33 – 35 | 1,2,3,4-Tetrachlorobutane | 2hr (14days) | | 14days | |
| 36 – 43 | Trichlorobromomethane | 1min (3hr) | 3hr (5days) | 1hr (3days) | 3hr (3days) |
| 44 – 51 | Tetrabromomethane | 3hr (2days) | 1hr (2days) | 1hr (3days) | 3hr (2days) |
| 52 | 2,2,3,3-Tetrafluoropropanol | 5hr | | | |
| 53 – 57 | Hexachloroethane | 30min (10days) | 3days | 2days | 14days |
| 58 – 59 | Hexachlorocyclohexane | 3hr (16hr) | | | |
| 60 | Toluylchloride | (30min) | | | |
| 61 | Benzenesulfochloride | (1day) | | | |
| 62 | Fluorine | | (1min) | | |
| 63 | Chlorine | | (1min) | | |
| 64 | Bromine | | (1min) | | |
| 65 | Iodine | | (1min) | | |
| 66 | Aluminium(111)chloride | | (1min) | | |
| 67 | Titanium(IV)chloride | | (1min) | | |
| 68 | Silicon(IV)chloride | | (1min) | | |

Table 1-continued (Examples 1 to 72)
In all cases, a solution of 0.1 gram of polymer or copolymer in 2 ml of benzene was used. The amount of halogen compound was equimolar to the amino group content of the polymer.

| Example | Halogen compound | Period required for the formation of gel | | | |
|---|---|---|---|---|---|
| | | PolyDmas | PolyDMAEA-MMA | PolyDMAEMA | PolyDMAEA |
| 69 | Tin(IV)chloride | | (1min) | | |
| 70 | Phosphoryl trichloride | (1min) | | | |
| 71 | Thionyl chloride | (1min) | | | |
| 72 | Disulfur dichloride | (1day) | | | |

Table II (Examples 73 to 78)
In all cases a solution of 0.1 gram of poly (dimethylaminoethyl acrylate) in 2 ml of water with $3.5 \times 10^{-4}$ mole of various halogen compounds was employed.

| Example | Halogen compound | Period required for formation of gel |
|---|---|---|
| 73 | Chloral | (1 min) |
| 74 | Titanium (111) chloride | (6 days) |
| 75 | Potassium bromate | (6 days) |
| 76 | Potassium iodate | (6 days) |
| 77 | Cobalt (11) chloride | (4 days) |
| 78 | Rhodium (111) chloride | (1 min) |

Table III (Examples 79 to 82)
In these examples, a latex of styrene-p-dimethylaminostyrene copolymer, containing about 20% of dry substance, (molar ratio of monomers 3.25:1) with potassium laurate$^a$ or Mersolate$^b$ as emulsifiers was employed. The amount of halogen compound was equimolar to the content of amino groups in the polymer.

| Example | Halogen compound | Period required for formation of gel |
|---|---|---|
| 79 | Trichloroethanol$^a$ | 10 min (10 Hr) |
| 80 | Trichloroethanol$^b$ | 10 min (10 Hr) |
| 81 | Tetrachlorobutane$^a$ | 20 min |
| 82 | Trichlorobromomethane$^b$ | 5 min |

EXAMPLE 83

1 gram of poly (dimethylaminoethyl acrylate) and 0.2 gram of hexachloroethane were melted in a test tube (Sial glass) placed in a bath at 120° C. The melt was cooled and kept for 5 hours in the daylight. After this period, the polymer formed did not dissolve, but only swelled, in benzene.

EXAMPLE 84

A film of poly (dimethylaminoethyl acrylate) was treated with vapours of trichlorobromomethane in a closed vessel made from Sial glass. The swollen film was removed from the vessel after 5 hours and dried in air. It dissolved neither in benzene nor in water.

There was also used as halogen compound the following polymers with halogen chemically bound in the chain. Copolymer of styrene and 2,3-dichloropropene with 15.53% of chlorine prepared from 0.124 mole of styrene and 0.159 mole of 2,3-dichloropropene; poly-(2,2,2-trichloroethyl acrylate); copolymer of styrene and vinylidene chloride with 22.2% Cl prepared from 0.144 mole of styrene and 0.198 mole of vinylidene chloride; copolymer of styrene and trichloroethylene with 7.07% Cl prepared from 0.124 mole of styrene and 0.163 mole of trichloroethylene; copolymer of styrene and trichloroethyl acrylate prepared from 0.099 mole of styrene and 0.0086 mole of trichlorethyl acrylate; brominated polychloroprene.

Table IV contains the results of their action on the polymers containing tertiary amino groups.

Table IV (Examples 85 to 100)
In all cases, a solution of 0.15 gram of the halogen containing polymer and 0.15 gram of the polymer containing tertiary amino groups in 6 ml of benzene was employed.

| Example | Halogen Containing Polymer | Period required for formation of gel | | | |
|---|---|---|---|---|---|
| | | PolyDMAS | PolyDMAEA | PolyDMAEMA | PolyDMAEA-MMA |
| 85–88 | Poly(styrene-co-2,3-dichloropropene | 12hr(72hr) | | (72hr) | |
| 89–91 | Poly(2,2,2-trichloroethyl acrylate) | 1min | 1min | | 2hr |
| 92–93 | Poly(styrene-co-vinylidene chloride) | 12hr(24hr) | | | |
| 94–95 | Poly(styrene-co-trichloroethylene) | 12hr(24hr) | | | |
| 96 | Poly(styrene-co-trichloroethyl acrylate) | 48hr | | | |
| 97–100 | Brominated polychloroprene | | 4hr(24hr) | | 3hr(12hr) |

Numerous variations of this invention may be made without departing from the spirit and scope thereof. It is to be understood, therefore, that this invention is not to be limited to the embodiments disclosed herein except as defined in the appended claims.

What is claimed is:

1. A process for forming polymer gel by chemically connecting at least two polymeric molecules each of which contains at least one chemically bound tertiary amino group and which polymeric molecules are polymers and copolymers selected from the group consisting of poly (dimethylaminoethyl) methacrylate and poly (dimethylaminoethyl) acrylate, comprising the steps of mixing said polymeric molecules together, contacting the mixture with a material selected from the group consisting of elemental halogens, halogen containing organic compounds and inorganic halogen compounds of the elements of the third, fourth, fifth, sixth, seventh and eighth groups of the Periodic Table in an amount and for a time sufficient to cause substantially complete reaction of the tertiary amino groups in the mixture of polymeric molecules with said contacting material to form a connected polymeric product and thereafter recovering said product.

2. A process as defined in claim 1 wherein the tertiary amino groups in said mixture are present in a minor proportion and the product formed is a non-cross-linked material.

3. A process as defined in claim 1 wherein the tertiary amino groups in said mixture are present in a major proportion and the product formed is a cross-linked material.

4. A process as defined in claim 1 wherein said contacting material is elemental chlorine.

5. A process as defined in claim 1 wherein said contacting material is ethyliodide.

6. A process as defined in claim 1 wherein said contacting material is tetrachloromethane.

7. A process as defined in claim 1 wherein said contacting material is trichloroethylene.

8. A process as defined in claim 1 wherein said contacting material is hexachloroethane.

9. A process as defined in claim 1 wherein said contacting material is aluminum chloride.

10. A process as defined in claim 1 wherein the reaction is carried out at ambient temperatures.

11. The process as defined in claim 1 wherein the amount of said contacting material is at least equimolar to the amino group content of said mixture.

* * * * *